United States Patent Office 3,381,547
Patented May 7, 1968

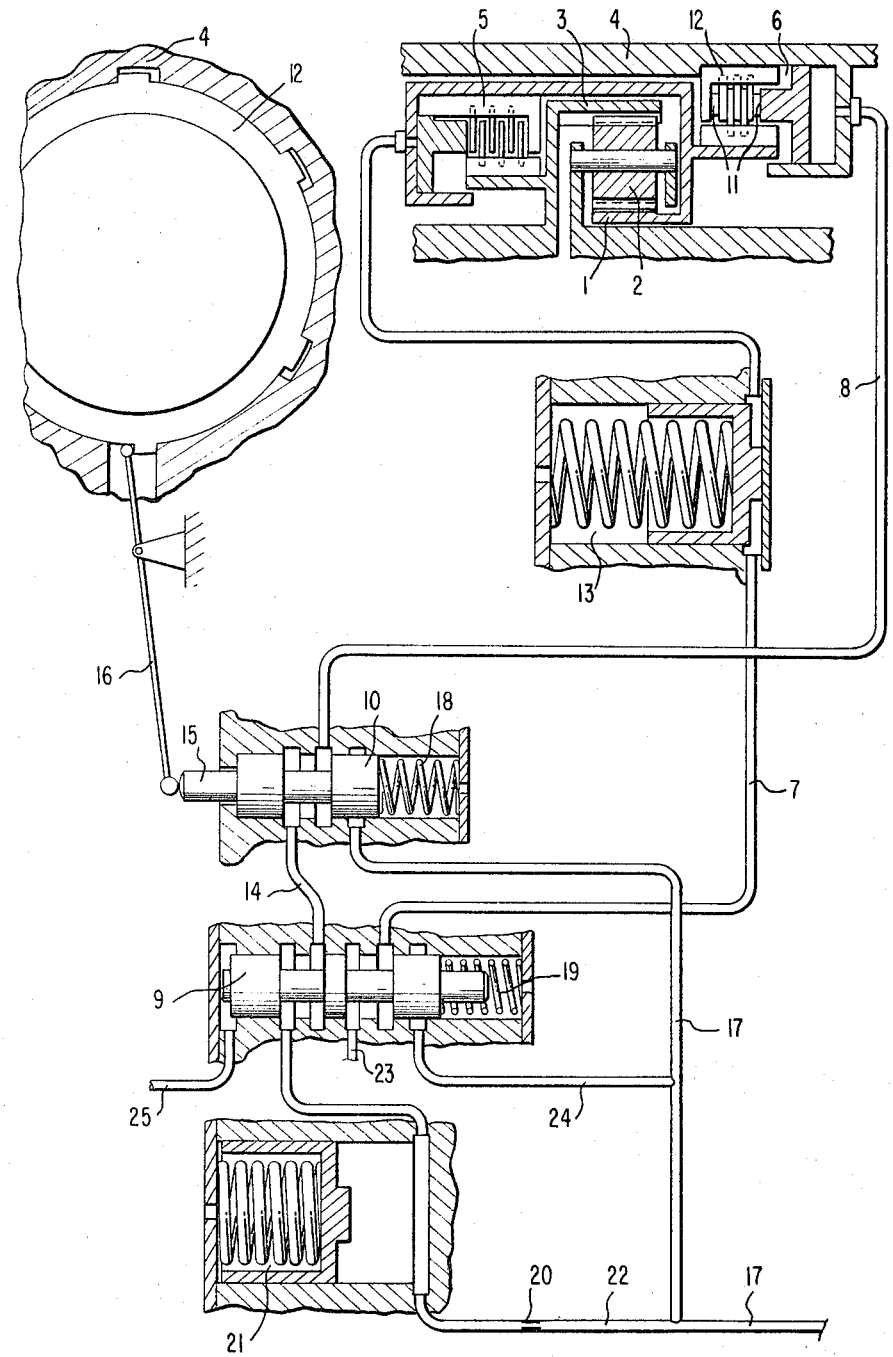

3,381,547
SHIFTING CONTROL MECHANISM
Hans-Joachim M. Förster and Ulrich Eltze, Stuttgart-Riedenberg, Germany, assignors to Daimler-Benz Aktiengesellschaft, Stuttgart-Unterturkheim, Germany
Filed June 5, 1964, Ser. No. 372,934
Claims priority, application Germany, June 7, 1963, D 41,726
20 Claims. (Cl. 74—781)

The invention relates to a shifting mechanism for change-speed gears used in motor vehicles having at least one planetary gear set which may be changed over between a lower and an upper gear speed by means of control elements controlled by control pistons whereby the fluid pressure is supplied to the control elements through pressure-operated control pistons and control members formed as a control piston automatically responding to the change of direction of rotation at the corresponding gear member.

In a known device of the above-mentioned type, an additional spring-loaded pressure fluid reservoir is provided between the pressure fluid-operated control piston and the direction of rotation interdependent control piston which, during shifting of the gear from a higher into a lower speed, serves as a source of power for the free-wheeling-like operation of the shifting elements so that the unloaded motor during this shifting phase may increase its speed to correspond to the lower gear speed.

On the other hand, such devices have failed to perform the necessary additional task during shifting under acceleration from a lower into a higher gear speed to reduce the engine rotative speed to a speed corresponding to the higher gear speed. This problem is solved by the invention through the use of friction movements to reduce the engine speed. In providing such friction movements, the working pressure line from the pressure fluid-operated control piston to the control element of the upper gear speed is provided with a spring-loaded pressure fluid reservoir; and, the control piston dependent on the direction of rotation is designed such that in its position corresponding to shifting during acceleration, it connects the working pressure line to the shifting element of the lower gear speed by means of a first working pressure line, and in its position corresponding to shifting during deceleration, it vents the line leading to the fluid-operated control piston, which is in communication with a neutral line corresponding to the upper shifting position.

In a further development of the invention, the pressure fluid-operated control piston is constructed in such a manner that when in its position corresponding to shifting of the upper gear speed, it connects the line to the control element of the upper gear speed with a branch line of the working pressure line as well as with a neutral line leading to the direction of rotation dependent control piston, thereby blocking a second branch line branching off the working fluid line; whereas, in its position corresponding to the shifting of the lower gear speed, it connects the line leading to the control element of the upper gear speed with the neutral line and the line leading to the direction of rotation dependent control piston connects to the second branch line, whereby it blocks the first branch line.

In order that the direction of rotation dependent control piston may perform its function even during operation of the shifting elements, constructed as multiple disk brakes for the lower gear speed, the outer disks of the control element are, according to a further characteristic of the invention, arranged axially in relation to the gear housing. This is advantageously obtained by means of axial needle bearings. It may also be possible to arrange the brake housing including the carriers for the outer disks rotatably restricted in relation to the gear axis and in relation to the gear housing. In this manner, it is possible to transmit, even with the shifting elements in operation, the tangential clearance of its outer disks in relation to the gear housing in a known manner through a linkage into a control movement of the control piston.

For the free-wheeling-like operation of the control element for the lower gear speed and during reverse shifting of the planetary gear set, a choke is provided in the second branch line and a spring-loaded pressure fluid reservoir is provided between the pressure fluid-operated control piston and the choke.

Such a characterized solution of a shifting mechanism allows shifting under acceleration from a lower into a higher gear speed by loading the motor so as to effect a correspondence of its rotative speed to the higher gear speed by means of friction moments in the gearing corresponding to the higher gear speed, thereby insuring disconnecting of the control element of the lower gear speed at the exact time of reversal of the torque.

Accordingly, it is an object of the instant invention to provide a shifting mechanism for change-speed gears in motor vehicles wherein an increase in the rotative speed of the motor is automatically prevented during the operation of shifting from low speed to high speed gears while accelerating by the introduction of friction moments in said gears.

It is another object of the instant invention to provide a shifting mechanism of the type described wherein during the operation of shifting from low speed to high speed gears while accelerating, the rotative engine speed will be automatically reduced to a speed corresponding to the higher gear speed.

It is a further object of the instant invention to provide a shifting mechanism of the type described wherein the direction of rotation dependent control piston is selectively positioned by the lower gear shifting elements in accordance with an indication produced by one of said shifting elements of the relative speed of said motor and the high speed gears.

It is still another object of the instant invention to provide a shifting mechanism of the type described wherein during the operation of shifting from high speed to low speed gears during deceleration the control element for the lower speed gears undergoes free-wheeling-like operation due to reduced pressure to said lower gear-shifting elements.

These and other objects, features and advantages of the present invention will become more obvious from the following description when taken in connection with the accompanying drawing which shows, for purposes of illustration only, one embodiment in accordance with the present invention, and wherein the sole figure illustrates one embodiment of the instant invention.

Looking to the details of the invention as shown in the drawing, for shifting the planetary gear set supported in the gear housing 4, comprising the sun gear 1, planet gears 2 and hollow gear 3, there are provided shifting elements 5 for the high gear speed arranged between hollow gear 3 and sun gear 1, as well as shifting elements 6 for the lower gear speed arranged at the sun gear 1 and the gear housing 4. The shifting element 6 for the lower gear speed is constructed as a multiple disk brake, the outer disk 12 of which is rotatably limited in relation to the gear housing 4, and all of the disks of which are supported axially by means of needle bearings 11. The limited tangential movement of the outer disks 12 is transmitted into a control movement utilized to position the control piston 10 in accordance with the direction of rotation thereof, which movement is effected by means of a linkage 16 connected with the actuating rod 15 of the control piston 10, which rod is spring-loaded by spring 18 so as to normally urge the piston to the left, as seen in the figure. The control piston 10 connects the working pressure line 8 leading to the shifting element 6 of the lower gear speed either with the working pressure line 17, which is connected to the normal source of fluid pressure for the transmission (not shown), or with a line 14 leading to the pressure fluid-operated control piston 9 depending upon the orientation of the piston, as determined by the position of the disk 12.

The control piston 9 in its shifting position corresponding to the upper gear speed is loaded by the control pressure in the control line 25 so that the piston 9 is shifting against the bias of spring 19, thereby connecting the working pressure line 7 operatively associated with the spring-loaded pressure fluid reservoir 13 and the shifting elements 5 of the upper gear speed, to a first branch line 24 branching off the working pressure line 17 and connecting the line 14 from the direction of rotation control piston 10 with the neutral line 23, whereas a second branch line 22 branching off the working pressure line 17 through a choke 20 and a spring-loaded pressure fluid reservoir 21, is closed.

The control piston 9, illustrated in the figure in its shifting position corresponding to a lower gear speed loaded only by its spring 19, connects line 14 with the second branch line 22 of working pressure line 17 and connects the working pressure line 7 with the neutral line 23, whereas the first branch line 24 is closed.

The mode of operation of the shifting mechanism is as follows:

Beginning with the lower gear speed, the control piston 9 is in the illustrated position, there being no pressure on line 25. In this position the shifting element 5 for the upper gear speed is vented through working pressure line 7 and neutral line 23; the first branch line 24 of the working pressure line 17 is closed. At the same time, the shifting element 6 of the lower gear speed is pressurized directly either by the full pressure of the working pressure line 17 or indirectly from line 17 through line 14 and the second branch line 22, depending upon the position of the direction of rotation dependent control piston 10. It is immaterial for this shifting position of the control piston 9 whether the engine pulls the vehicle or is pushed by the vehicle.

The shifting into higher gear is started by the movement of the control piston 9 into its right end position upon application of pressure to line 25 in the normal manner. At this time the shifting element 5 of the upper gear speed receives pressure through lines 7 and 24, which pressure increases gradually to the full pressure of the working pressure line 17 due to the increasing spring pressure of the slowly filling pressure fluid reservoir 13. At the same time, line 14 is unloaded and the second branch line 22 is closed.

As can be seen from the figure, under these conditions, the position of the direction of rotation control piston 10 is important. If shifting into higher gear occurs during deceleration, the outer disks 12 perform a movement in the direction of rotation of the engine so that the control piston 10 stays in the left end position, as illustrated, and the shifting element 6 for the lower speed gear is immediately vented through working pressure line 8, line 14 and neutral line 23.

However, if shifting into higher gear occurs during acceleration, the outer disk 12 will rotate in a direction opposite the direction of rotation of the engine so that the control piston 10 will remain for a time in its right end position. Under this condition, the shifting element 6 for the lower gear speed remains under the full pressure of the working pressure line 17 so that full pressure is supplied to both of the shifting elements 5 and 6, thereby providing an increased load on the motor due to friction of the elements 5. Only reversal of the movement of the outer disks 12, as the engine speed is reduced to the speed of the higher gear, will effect movement of the control piston 10 into the left end position and release line 14 for venting of the shifting element 6.

Inasmuch as the shifting element 6 for the lower gear speed is vented only after the shifting element for the upper gear speed has already engaged, the rotative speed of the engine during the described shifting operation by means of friction moments in the gearing, cannot increase.

During reverse shifting from a higher to a lower speed gear, the control piston 9 as a result of removal of the control pressure in the control line 25, returns into the extreme left position, as shown, corresponding to the lower gear speed so that the shifting element 5 of the upper gear speed is vented through the working pressure line 7 and neutral line 23. The shifting element 6 of the lower gear speed is, as a result of the choke 20, in series with the spring-loaded pressure fluid reservoir 21, provided with a considerably smaller pressure than the full working pressure via the line 14 and control piston 10, which at the beginning of the shifting operation is in the left position.

Therefore, if reverse shifting takes place during deceleration, that is, without reversal of the control piston 10 due to movement of outer disk 12, the shifting element 6 transmits the full braking moment only when the pressure in the pressure fluid reservoir 21 has attained a sufficiently high value.

If reverse shifting during acceleration takes place, the control piston 10 by reversal of the direction of rotation of the friction disk 12 is shifted into its right end position and the shifting element for the lower gear speed is pressure-loaded by the full pressure of the working pressure line 17 via control valve 10 and line 8.

It will be noted that the construction shown and described will serve to completely accomplish the objects stated above. It is to be understood, however, that the construction disclosed is intended merely as illustrative of the invention and not as limiting thereof, since various modifications within the ability of the ordinary worker in the art may be made without departing from the invention.

We claim:

1. A shifting mechanism for a change-speed transmission having at least one planetary gear set capable of being changed over between a lower gear speed and an upper gear speed comprising, first and second shifting means for effecting shifting of said planetary gear set to the lower and upper gear speeds, respectively, a source of fluid pressure, a first control piston means for selectively connecting one of said first and second shifting means to said source of fluid pressure, fluid reservoir means interposed between said first control piston means and said second shifting means for delaying the application of full source pressure to said second control means, delay means for normally producing a substantial delay in the establishment of full pressure from said fluid source in said first shifting means by said first control piston means, and a second control piston means operatively connected between said first control piston means and said first shifting means responsive to a reversal of torque during acceleration in said transmission during shifting of said planetary gear set between lower and upper gear speeds to selectively connect said first shifting means directly to said source of fluid first and second shifting means for effecting shifting of said planetary gear set to the lower and upper gear speeds, respectively, a source of fluid pressure, a first control piston means for selectively connecting one of said first and second shifting means to said source of fluid pressure, fluid reservoir means interposed between said first control piston means and said second shifting means for delaying the application of full source pressure to said second control means, and a second control piston means operatively connected between said first control piston means and said first shifting means responsive to a reversal of torque in said transmission during shifting of said planetary gear set between lower and upper gear speeds to selectively connect said first shifting means directly to said source of fluid pressure simultaneously with connection of said second shifting means with said source of fluid pressure, said first control piston means being normally operative during shifting of said planetary gear set from lower to upper gear speeds to disconnect said source of fluid pressure from said first shifting means and to connect said source of pressure to said second shifting means, said first shifting means being in the form of a multiple disk brake for the lower gear speed supported axially within said transmission.

7. A shifting mechanism for a change-speed transmission having at least one planetary gear set capable of being changed over between a lower gear speed and an upper gear speed comprising:

first and second shifting means for effecting shifting of said planetary gear set to the lower and upper gear speeds, respectively, pressure means for selectively actuating one of said shifting means, and control means for controlling said pressure means in response to a reversal of torque in said transmission during shifting of said planetary gear set between lower and upper gear speeds to simultaneously actuate both of said first and second shifting means, said pressure means being normally operative during shifting of said planetary gear set from lower to upper gear speeds to actuate said second shifting means and de-activate said first shifting means, said control means including means responsive to the direction of torque transmittal through said first shifting means during said reversal for producing an impulse to control said control means and being responsive to elimination of said reversal of torque to de-activate said first shifting means, said first shifting means including engageable friction disks and two relatively rotatable members, one of said members having means for mounting one of said friction disks with a predetermined freedom of movement in the circumferential direction thereof.

8. A shifting mechanism for a change-speed transmission having at least one planetary gear set capable of being changed over between a lower gear speed and an upper gear speed comprising:

first and second shifting means for effecting shifting of said planetary gear set to the lower and upper gear speeds, respectively, pressure means for selectively actuating one of said shifting means, and control means for controlling said pressure means in response to a reversal of torque in said transmission during shifting of said planetary gear set between lower and upper gear speeds to simultaneously actuate both of said first and second shifting means, said first shifting means including engageable friction disks and two relatively rotatable members, one of said members having means for mounting one of said friction disks with a predetermind freedom of movement in the circumferential direction thereof.

9. A shifting mechanism for a change-speed transmission having at least one planetary gear set capable of being changed over between a lower gear speed and an upper gear speed comprising first and second force-locking shifting means for effecting shifting of said planetary gear set to one of two operative gear ratios of said transmission, responsive means upon actuation of said second shifting means and de-actuation of said first shifting means for detecting a reversal of torque in said first shifting means and for producing an impulse in response thereto, and control means responsive to said impulse to effect simultaneous actuation of both of said first and second shifting means, said first shifting means including engageable friction disk means and said responsive means providing an additional friction disk associated operatively with said friction disk means.

10. A shifting mechanism for a change-speed transmission having at least one planetary gear set capable of being changed over between a lower speed and an upper gear speed comprising first and second force-locking shifting means for effecting shifting of said planetary gear set to one of two operative gear ratios of said transmission, responsive means upon actuation of said second shifting means and de-actuation of said first shifting means for detecting a reversal of torque in said first shifting means and for producing an impulse in response thereto, and control means responsive to said impulse to effect simultaneous actuation of both of said first and second shifting means, said first shifting means including engageable friction disk means and said responsive means providing an additional friction disk associated operatively with said friction disk means, said first shifting means being in the form of a multiple disk brake for the lower gear speed including engageable friction disk means, a brake actuating member and abutment means for supporting said brake actuating means, said responsive means including an additional friction disk operatively associated with said friction disk means and mounted for limited circumferential movement in said abutment means, said reversal of torque being determined by movement of said additional friction disk in relation to said abutment means.

11. A shifting mechanism for a change-speed transmission having at least one planetary gear set capable of being changed over between a lower gear speed and an upper gear speed comprising:

first and second force-locking shifting means for effecting shifting of said planetary gear set to a lower and upper gear speed, respectively, actuating means for selectively actuating one of said shifting means to determine the operative gear ratio of said transmission, detection means associated with said first shifting means for detecting a reversal of torque in said transmission during shifting of said gear ratio, and control means responsive to said detection means for controlling said actuating means to effect simultaneous actuation of both of said first and second shifting means until said reversal of torque is eliminated, said first shifting means including engageable friction disk means and said control means includes a control slide valve member, and a mechanical connection between said detection means and said control valve slide member.

12. A shifting mechanism for a change-speed transmission having at least one planetary gear set capable of being changed over between a lower gear speed and an upper gear speed comprising:

pressure and bypassing said delay means simultaneously with connection of said second shifting means with said source of fluid pressure.

2. A shifting mechanism for a change-speed transmission having at least one planetary gear set capable of being changed over between a lower gear speed and an upper gear speed comprising,
first and second shifting means for effecting shifting of said planetary gear set to the lower and upper gear speeds, respectively,
a source of fluid pressure,
a first control piston means for selectively connecting one of said first and second shifting means to said source of fluid pressure,
fluid reservoir means interposed between said first control piston means and said second shifting means for delaying the application of full source pressure to said second control means,
and a second control piston means operatively connected between said first control piston means and said first shifting means responsive to a reversal of torque in said transmission during shifting of said planetary gear set between lower and upper gear speeds to selectively connect said first shifting means directly to said source of fluid pressure simultaneously with connection of said second shifting means with said source of fluid pressure,
said first control piston means being normally operative during shifting of said planetary gear set from lower to upper gear speeds to disconnect said source of fluid pressure from said first shifting means and to connect said source of pressure to said second shifting means,
a choke means and an additional reservoir means operatively associated with said first control piston means for effecting a delay in the application of full source pressure to said second control piston means for actuation of said first shifting means.

3. A shifting mechanism for a change-speed transmission having at least one planetary gear set capable of being changed over between a lower gear speed and an upper gear speed comprising,
first and second shifting means for effecting shifting of said planetary gear set to the lower and upper gear speeds, respectively,
a source of fluid pressure,
a first control piston means for selectively connecting one of said first and second shifting means to said source of fluid pressure,
fluid reservoir means interposed between said first control piston means and said second shifting means for delaying the application of full source pressure to said second control means,
and a second control piston means operatively connected between said first control piston means and said first shifting means responsive to a reversal of torque in said transmission during shifting of said planetary gear set between lower and upper gear speeds to selectively connect said first shifting means directly to said source of fluid pressure simultaneously with connection of said second shifting means with said source of fluid pressure,
said first control piston means being normally operative during shifting of said planetary gear set from lower to upper gear speeds to disconnect said source of fluid pressure from said first shifting means and to connect said source of pressure to said second shifting means,
a choke means and an additional reservoir means operatively associated with said first control piston means for effecting a delay in the application of full source pressure to said second control piston means for actuation of said first shifting means,
said first shifting means being in the form of a multiple disk brake for the lower gear speed supported axially within said transmission.

4. A shifting mechanism for a change-speed transmission having at least one planetary gear set capable of being changed over between a lower gear speed and an upper gear speed comprising,
first and second shifting means for effecting shifting of said planetary gear set to the lower and upper gear speeds, respectively,
a source of fluid pressure,
a first control piston means for selectively connecting one of said first and second shifting means to said source of fluid pressure,
fluid reservoir means interposed between said first control piston means and said second shifting means for delaying the application of full source pressure to said second control means,
and a second control piston means operatively connected between said first control piston means and said first shifting means responsive to a reversal of torque in said transmission during shifting of said planetary gear set between lower and upper gear speeds to selectively connect said first shifting means directly to said source of fluid pressure simultaneously with connection of second shifting means with said source of fluid pressure,
said first control piston means being normally operative during shifting of said planetary gear set from lower to upper gear speeds to disconnect said source of fluid pressure from said first shifting means and to connect said source of pressure to said second shifting means,
a choke means and an additional reservoir means operatively associated with said first control piston means for effecting a delay in the application of full source pressure to said second control piston means for actuation of said first shifting means,
said first shifting means being in the form of a multiple disk brake for the lower gear speed supported axially within said transmission by means of axial needle bearings.

5. A shifting mechanism for a change-speed transmission having at least one planetary gear set capable of being changed over between a lower gear speed and an upper gear speed comprising,
first and second shifting means for effecting shifting of said planetary gear set to the lower and upper gear speeds, respectively,
a source of fluid pressure,
a first control piston means for selectively connecting one of said first and second shifting means to said source of fluid pressure,
fluid reservoir means interposed between said first control piston means and said second shifting means for delaying the application of full source pressure to said second control means,
and a second control piston means operatively connected between said first control piston means and said first shifting means responsive to a reversal of torque in said transmission during shifting of said planetary gear set between lower and upper gear speeds to selectively connect said first shifting means directly to said source of fluid pressure simultaneously with connection of said second shifting means with said source of fluid pressure,
a choke means and an additional reservoir means operatively associated with said first control piston means for effecting a delay in the application of full source pressure to said second control piston means for actuation of said first shifting means,
said first shifting means being in the form of a multiple disk brake for the lower gear speed supported axially within said transmission.

6. A shifting mechanism for a change-speed transmission having at least one planetary gear set capable of being changed over between a lower gear speed and an upper gear speed comprising, first and second force-locking shifting means for effecting shifting of said planetary gear set to a lower and an upper gear speed, respectively, actuating means for selectively actuating one of said shifting means to determine the operative gear ratio of said transmission, detection means associated with said first shifting means for detecting a reversal of torque in said transmission during shifting of said gear ratio, and control means responsive to said detection means for controlling said actuating means to effect simultaneous actuation of both of said first and second shifting means until said reversal of torque is eliminated, said first shifting means including engageable friction disk means and said control means includes a control slide valve member, and a mechanical connection between said detection means and said control valve slide member, said detection means including an additional friction disk operatively associated with said friction disk means and being limited to movement in the circumferential direction between two positions, one of said positions representing the normal direction of torque and the other position representing a reversal of torque in said transmission.

13. The device of claim 1, wherein said first control piston means is normally operative during shifting of said planetary gear set from said lower to upper gear speeds, without reversal of torque to disconnect said source of fluid pressure from said first shifting means and to connect said source of pressure to said second shifting means.

14. The device of claim 21, wherein said first control piston means is normally operative to disconnect said second shifting means and connect said first shifting means to said source of fluid pressure during shifting from upper to lower gear speeds.

15. The device of claim 14, wherein said second control piston means includes means for braking one of the gear elements in said planetary gear set, valve means normally biased to establish fluid communication between said first shifting means and said source of fluid pressure through said first control piston means and said delay means and being shiftable against its bias to establish direct fluid communication between said source of fluid pressure and said first shifting means, and lost motion means providing a lost motion connection between said braking means and a stationary portion of the transmission for shifting said valve means against its bias upon a reversal of torque from deceleration to acceleration in the transmission.

16. The device of claim 15, wherein said planetary gear set includes a carrier element having a plurality of planet gears mounted thereon, a sun gear in engagement with said planetary gears and being selectively braked by said braking means, and a ring gear output element in engagement with said planetary gears; said second shifting means including a clutch means for selectively drivingly connecting said ring gear and said sun gear; and said first shifting means including said braking means.

17. The device of claim 16, wherein said valve means is a spring urged spool valve having only a first port in fluid communication with said first shifting means, a second port in fluid communication with said first control piston means and a third port in fluid communication with said source of fluid pressure and being operative to normally provide fluid communication only between said first and second ports and being shiftable against its bias to establish fluid communication only between said first and third ports; said first control piston means including a spool slide valve having a first port in fluid communication with said valve means second port, a second port in fluid communication with said fluid reservoir means and said second shifting means, a third port in fluid communication with said source of fluid pressure, a fourth exhaust port and a fifth port in fluid communication with said source of fluid pressure, and being shiftable between a first position establishing communication between said first and fifth ports and between said second and fourth ports, and a second position establishing fluid communication between said first and fourth ports and between said second and third ports.

18. The device of claim 1, wherein said second control piston means includes means for braking one of the gear elements in said planetary gear set, valve means normally biased to establish fluid communication between said first shifting means and said source of fluid pressure through said first control piston means and said delay means and being shiftable against its bias to establish direct fluid communication between said source of fluid pressure and said first shifting means, and lost motion means providing a lost motion connection between said braking means and a stationary portion of the transmission for shifting said valve means against its bias upon a reversal of torque from deceleration to acceleration in the transmission.

19. The device of claim 18, wherein said planetary gear set includes a carrier element having a plurality of planet gears mounted thereon, a sun gear in engagement with said planetary gears and being selectively braked by said braking means, and a ring gear output element in engagement with said planetary gears; said second shifting means including a clutch means for selectively drivingly connecting said ring gear and said sun gear; and said first shifting means including said braking means, wherein said valve means is a spring urged spool valve having only a first port in fluid communication with said first shifting means, a second port in fluid communication with said first control piston means and a third port in fluid communication with said source of fluid pressure and being operative to normally provide fluid communication only between said first and second ports and being shiftable against its bias to establish fluid communication only between said first and third ports; said first control piston means including a spool slide valve having a first port in fluid communication with said valve means second port, a second port in fluid communication with said fluid reservoir means and said second shifting means, a third port in fluid communication with said source of fluid pressure, a fourth exhaust port and a fifth port in fluid communication with said source of fluid pressure, and being shiftable between a first position establishing communication between said first and fifth ports and between said second and fourth ports, and a second position establishing fluid communication between said first and fourth ports and between said second and third ports.

20. The device of claim 18, wherein said valve means is a spring urged spool valve having only a first port in fluid communication with said first shifting means, a second port in fluid communication with said first control piston means and a third port in fluid communication with said source of fluid pressure and being operative to normally provide fluid communication only between said first and second ports and being shiftable against its bias to establish fluid communication only between said first and third ports; said first control piston means including a spool slide valve having a first port in fluid communication with said valve means second port, a second port in fluid communication with said fluid reservoir means and said second shifting means, a third port in fluid communication with said source of fluid pressure, a fourth exhaust port and a fifth port in fluid communication with said source of fluid pressure, and being shiftable between a first position establishing communication between said first and fifth ports and between said second and fourth ports, and a second position establishing fluid communication between said first and fourth ports and between said second and third ports.

References Cited

UNITED STATES PATENTS

| | | | |
|---|---|---|---|
| 2,792,716 | 5/1957 | Christenson | 74—472 |
| 2,818,708 | 1/1958 | Kelley | 60—54 |
| 2,946,241 | 7/1960 | Snyder | 74—751 X |
| 3,007,313 | 11/1961 | Snoy | 60—54 |
| 3,230,792 | 1/1966 | Kelley | 74—751 X |
| 3,251,245 | 5/1966 | Foerster | 74—751 |

DONLEY J. STOCKING, *Primary Examiner.*

DAVID J. WILLIAMOWSKY, *Examiner.*

J. R. BENEFIEL, *Assistant Examiner.*